(12) United States Patent
Hurst et al.

(10) Patent No.: US 7,046,847 B2
(45) Date of Patent: May 16, 2006

(54) DOCUMENT PROCESSING METHOD, SYSTEM AND MEDIUM

(75) Inventors: Matthew F. Hurst, Pittsburgh, PA (US); Tetsuya Nasukawa, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 09/891,080

(22) Filed: Jun. 25, 2001

(65) Prior Publication Data

US 2002/0016796 A1 Feb. 7, 2002

(30) Foreign Application Priority Data

Jun. 23, 2000 (JP) .............................. 2000-190335

(51) Int. Cl.
*G06K 9/34* (2006.01)
(52) U.S. Cl. ...................................... 382/176; 382/230
(58) Field of Classification Search ................ 382/173, 382/176, 180, 190, 201, 181, 177, 224–230; 358/462–464; 715/517–518; 704/1–10
See application file for complete search history.

(56) References Cited

U.S. PATENT DOCUMENTS

| | | | | |
|---|---|---|---|---|
| 5,062,143 A | * | 10/1991 | Schmitt | 382/230 |
| 5,724,593 A | * | 3/1998 | Hargrave et al. | 704/7 |
| 5,752,051 A | * | 5/1998 | Cohen | 704/1 |
| 5,761,631 A | * | 6/1998 | Nasukawa | 704/9 |
| 5,892,842 A | * | 4/1999 | Bloomberg | 382/173 |
| 6,134,565 A | * | 10/2000 | Hommersom et al. | 715/517 |
| 6,182,027 B1 | * | 1/2001 | Nasukawa et al. | 704/2 |
| 6,360,010 B1 | * | 3/2002 | Hu et al. | 382/180 |
| 6,374,210 B1 | * | 4/2002 | Chu | 704/9 |

FOREIGN PATENT DOCUMENTS

| | | | |
|---|---|---|---|
| JP | 02-008976 | | 1/1990 |
| JP | 02-288991 | | 11/1990 |
| JP | 05-334490 | | 12/1993 |
| JP | 5-334490 | * | 12/1993 |
| JP | 06-139404 | | 5/1994 |
| JP | 6-139404 | * | 5/1994 |
| JP | 11-191135 | * | 7/1999 |

OTHER PUBLICATIONS

Hurst, Layout and Language: An efficient Algorithm for detecting Text Blocks on Spatial and Linguistic Evidence, SPIE vol. 4307 (2001), 56-67.*

* cited by examiner

*Primary Examiner*—Joseph Mancuso
*Assistant Examiner*—Ishrat Sherali
(74) *Attorney, Agent, or Firm*—Satheesh Kara; Louis Percello; David Aker

(57) ABSTRACT

A technique for extracting a meaningful text block from a document where a table, an itemized list, a multiple column, etc., are arbitrarily laid out. A document is input which is laid out using blanks or the like, then a symbol is acquired which is associated with a spatial coordinate of the document. Consecutive characters of the same type are extracted from the symbol to generate a token and a space. A stream is generated from consecutive spaces in the column direction, while a text block is generated from streams and tokens. A link is generated between the text blocks to form a document graph. Validity of a connection (link) between the text blocks in the document graph is evaluated using a language model, then the text blocks are merged if the connection is valid.

20 Claims, 23 Drawing Sheets

```
0123456········                                                                                    ┌──► maxx
              ·················· Individual Grants ·······················     Potential Realizable
              ·Number of· Percent of ··············································· Value at Assumed
              ·Securities Total Options ····························· Annual Rates of Stock
              ·Underlying Granted to ···························· Price Appreciation
              ·Options   Employees in Exercise   Expiration    for Option Term
         Name  Granted(#) Fiscal Year Price($/sh)   Date       5 %($)  10%($)
         ─────────────────────────────────────────────────────────────────────
     Steven H. Rothman  50,000   31.3%    $4.43     8/31/2001    $0    $30,000
  □  Howard Paveny      50,000   31.3%    $4.43     8/31/2001    $0    $30,000
  □  Robert Fries                  3.1%                           $0       $0
  □  Ramón Mota          5,000    3.1%    $2.50    11/30/2001  $7,450  $12,650
              └────────────────────────────────────────────────────────────────┘
              ▲
             maxy
```

Fig. 2

| Name | Individual Grants | | | Exercise Price($/sh) | Expiration Date | Potential Realizable Value at Assumed Annual Rates of Stock Price Appreciation for Option Term | |
|---|---|---|---|---|---|---|---|
| | Number of Securities Underlying Options Granted | Percent of Total Options Granted to Employees in Fiscal Year | | | | 5%($) | 10%($) |
| Steven H. Rothman | 50,000 | 31.3% | | $4.43 | 8/31/2001 | $0 | $30,000 |
| Howard Pavony | 50,000 | 31.3% | | $4.43 | 8/31/2001 | $0 | $30,000 |
| Robert Fries | — | — | | — | — | $0 | $0 |
| Ramon Mota | 5,000 | 3.1% | | $2.50 | 11/30/2001 | $7,450 | $12,850 |

| Name | Individual Grants | | | Exercise Price($/sh) | Expiration Date | Potential Realizable Value at Assumed Annual Rates of Stock Price Appreciation for Option Term | |
|---|---|---|---|---|---|---|---|
| | Number of Securities Underlying Options Granted(#) | Percent of Total Options Granted to Employees in Fiscal Year | | | | 5 %($) | 10%($) |
| Steven H. Rothman | 50,000 | 31.3% | | $4.43 | 8/31/2001 | $0 | $30,000 |
| Howard Payony | 50,000 | 31.3% | | $4.43 | 8/31/2001 | $0 | $30,000 |
| Robert Fries | - | - | | - | - | $0 | $0 |
| Ramon Mota | 5,000 | 3.1% | | $2.50 | 11/30/2001 | $7,450 | $12,650 |

Fig. 12

| Name | Individual Grants | | | | Potential Realizable Value at Assumed Annual Rates of Stock Price Appreciation for Option Term | |
|---|---|---|---|---|---|---|
| | Number of Securities Underlying Options Granted (#) | Percent of Total Options Granted to Employees in Fiscal Year | Exercise Price ($/sh) | Expiration Date | 5% ($) | 10% ($) |
| Steven H. Rothman | 50,000 | 91.3% | $4.43 | 8/31/2001 | $0 | $30,000 |
| Howard Pavony | — | — | — | — | — | — |
| Robert Fries | — | — | — | — | — | — |
| Ramon Mota | 5,000 | 3.1% | $2.50 | 11/30/2001 | $7,450 | $12,650 |

```
1 (tokens, spaces)←tokenize(doc);
2 streams←stream(doc);
3 text_blocks←get_initial_blocks(tokens, spaces, streams);
4 links←get_initial_links(text_blocks);
5 document_graph←(text_blocks, links);
```

Fig. 16

```
1  cluster_set ← cluster(doc);
2  for all c ∈ cluster_set do {
3      sub_cluster_set ← sub-cluster(c);
4      for all s ∈ sub_cluster_set do {
5          for all links in s do {
6              if valid(link) then merge(sink, source);
7          }
8      }
9  }
```

```
1  perplexity←-3;
2  max_perplexity←get_max_perplexity;
3  while(perplexity<max_perplexity) do {
4      repeat while merges continue to be carried out
5      cluster_set←cluster(doc);
6      for all c∈ cluster_set do {
7          for all links in c do {
8              if(perplexity(link)<perplexity) then do {
9                  if unique_valid_link(link) then merge(sink, source);
10             }
11         }
12     }
13     perplexity←perplexity + 1;
14     max_perplexity←get_max_perplexity;
15 }
```

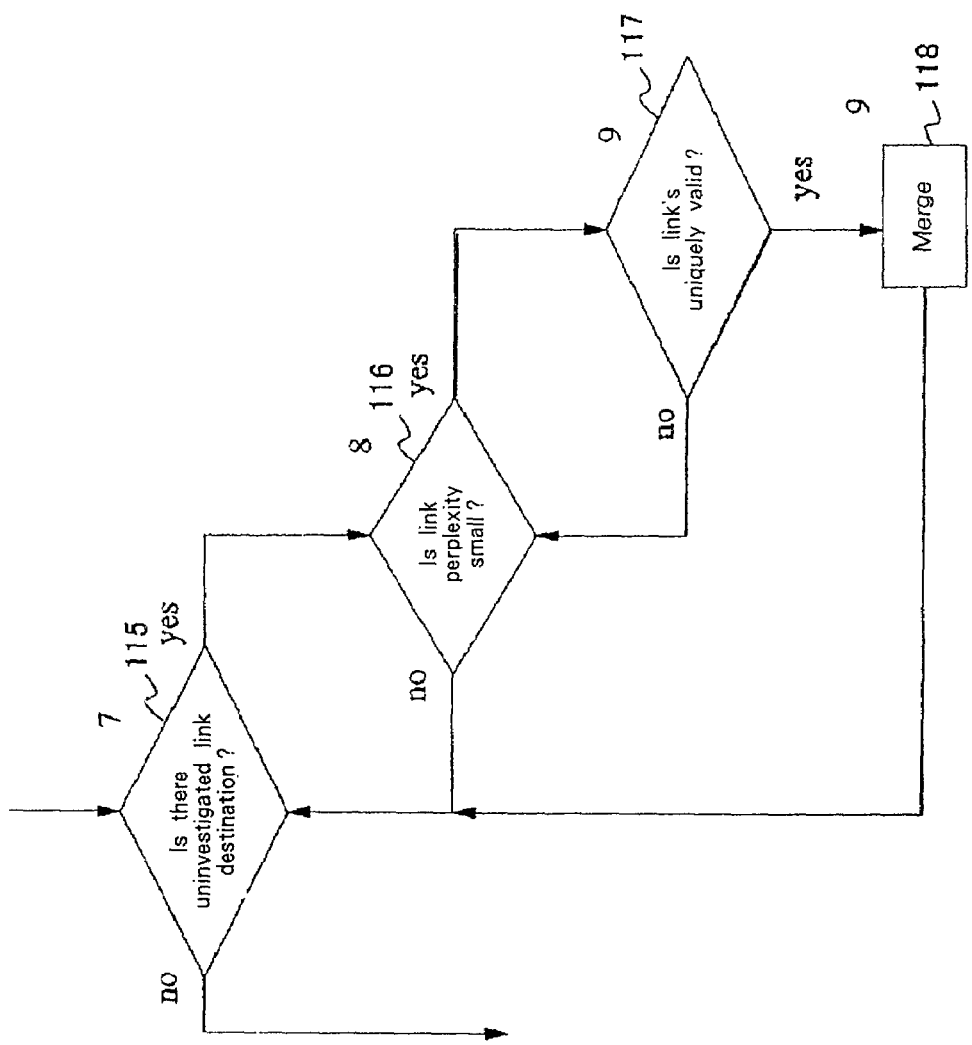

```
1  perplexity←3;
2  max_perplexity←get_max_perplexity;
3  while(perplexity<max_perplexity) do {
4      repeat while merges continue to be carried out
5      cluster_set←cluster(doc);
6      for all c ∈ cluster_set do {
7          ordered_links←get_ordered_links(c);
8          for each link ∈ ordered_links do {
9              if perplexity(link)<perplexity then do {
10                 if distinguished_valid_link(link) then merge(sink, source);
11             }
12         }
13     }
14     merge_unary_sub_clusters;
15     perplexity←perplexity + 1;
16     max_perplexity←get_max_perplexity;
17 }
```

Fig. 21

| | | |
|---|---|---|
| Double Columns | ... | Multi-column cell |
| False White Space Rivers | ... | Multi-row Cell |
| Apposed/Marginal Material | ... | Multi-row Stub Cells |
| Simple Apposed/Marginal Material | ... | Multiple Cells (below header) |
| Unmarked Headings | ... | Elliptical Contents Cell |
| Double Spacing | ... | Grid Quantization |
| Elliptical Lists | ... | Orientation Variation |
| Short Paragraphs | ... | One to Many, Many to One |

Fig. 24

DOCUMENT PROCESSING METHOD, SYSTEM AND MEDIUM

FIELD OF THE INVENTION

The present invention relates to a method, system and medium for extracting a meaningful text block from a document where a multiple column, a table, an itemized list, a title, etc., are arbitrarily laid out. The present invention is applicable as preprocessing for text mining processing and natural language processing such as machine translation.

BACKGROUND ART

Recently, an enormous number of computerized documents have been generated. These documents circulate over a computer network or are read by a reader such as a scanner. In view of these circumstances, it is desirable to have a way to utilize these documents. One method for utilizing such accumulated documents is text mining processing (that is, a kind of document search processing that automatically comprehends the summary of documents and comprehends a change with the passage of time and a trend in contents). Also, these documents may be utilized as original data for machine translation.

In order to utilize these accumulated documents, it is necessary to analyze the layout of the documents. As for typically circulated documents, such as a document uploaded in a home page, the layout is performed such that a human can easily comprehend visually. On the other hand, as for the documents computerized by a scanner, for example, a manuscript is a document of paper media, which is laid out according to a typical print format. These laid out documents include a title, a header, a list, a table, etc., as well as paragraphs corresponding to a body of the document, wherein a paragraph is often displayed in multiple columns such as a double column. Furthermore, a table may include not only elements written horizontally but also elements written vertically. For this reason, it is difficult to automatically analyze documents satisfactorily without considering the original document layout.

One method for analyzing layouts is to focus on spatial features. For example, when focusing on blanks, a paragraph following a blank line is estimated to be a paragraph.

Problems to be Solved by the Invention

However, there is a limit to the ability to extract significant text blocks by relying on spatial features. For example, comparing paragraph elements (i.e., text documents where sentences are typed in a massed area) with texts within a table, the usage of a blank is different. That is, when a blank character (or a blank according to a tab) is displayed in a line head, it is recognized to be the beginning of a paragraph, whereas a blank within a table is not usually arranged like this. Furthermore, when displayed in the list mode such as itemized lists, an indent may be inserted in a line head or a blank line may be inserted between lines. It is difficult to analyze these diversely laid out text documents uniformly by relying only on the presence of blanks.

In addition, even if a block of text is extracted based on the layout, a semantic evaluation of sentences (or a run of words) in that block is not performed. Accordingly, in case of elements such as tables, titles, lists, etc., which are not displayed as a massed text document such as a paragraph, the block may be separated. Thus, its meaning may not be perceived correctly.

In the case of advanced utilization of accumulated documents (e.g., text mining), it is necessary to discriminate the contents of documents automatically. However, important messages tend to be included in tables and lists (itemized lists) rather than paragraph elements. Conventionally, for an analysis of layouts based on spatial features, an analysis of elements such as tables and lists (itemized lists) has been abandoned due to the difficulty of their analysis (or their later utilization was difficult since the elements are segmented). However, when considering the later advanced utilization, important messages are more likely to be included in these elements such as tables and lists, so that it is desirable to extract them in such a form that is applicable to later semantics analysis.

SUMMARY OF THE INVENTION

It is therefor an object of the present invention to provide a technique for extracting a meaningful text block from a document where a table, an itemized list, a multiple column, etc., are arbitrarily laid out.

The present invention generates an object that composes a document, such as a token typified by a word, one or consecutive spaces composed of blank characters, or a combination thereof, from the document that is arbitrarily laid out by spaces such as a blank character. An object is generated with an associated spatial position. Then, a connection candidate between objects is generated. An object and connection candidate are associated with a dot (node) and a side (arc) of the graph theory. The validity of each link is determined using a language model (e.g., N gram model), then objects are connected if it is determined that the connection candidate (link) is valid.

By processing the document in this manner, a meaningful text block is efficiently extracted from documents that are laid out in various ways.

A connection candidate (link) generated between objects is generated between an object and another object that is located to the right side of it (in the case of horizontal writing) or between some object and an object that is located on the left side of it in the next line (in the case of horizontal writing).

Upon generating an object, an initial text block is generated by combining a plurality of tokens or spaces in a line. At this time, consecutive spaces in a column direction are defined as a stream, whereby information about a spatial position of this stream in a document is utilized. That is, a token that is separated by the stream is not combined, while a token that is not separated by the stream is combined.

Generation of tokens comprises acquiring characters one by one, associating each with a spatial coordinate in a document, and determining the type of character (alphabetical letter, symbol, or blank character). When the same type of characters continue, they are recorded as one token. On the other hand, when blanks continue, they are recorded as a space.

The validity of connection between objects is evaluated by the validity of connection of the initial text blocks. This evaluation is performed in multiple stages. First, for all connection candidates (i.e., connection likelihood) among a plurality of objects, a sub-cluster composed of a single element is generated (i.e., a set of objects that have a single input/output order). Then, the validity of connection for this single element sub-cluster is evaluated using a language model. If the connection is valid, the object that composes the single element sub-cluster (i.e., initial text block) is merged. Next, the validity of connection between the merged text blocks is evaluated using the same technique. In this way, all connection candidates are evaluated efficiently. If there is a single connection candidate, the source and destination object (i.e., initial text block and merged text block) of that connection candidate are merged without evaluation using a language model.

BRIEF DESCRIPTION OF THE DRAWINGS

FIG. 1(a) illustrates a configuration of a standalone computer, while FIG. 1(b) illustrates that of a computer network.

FIG. 2 illustrates an example of a document input to the present system.

FIG. 4 illustrates an example of a text block.

FIG. 5(a) illustrates an example of a graph, while FIG. 5(b) illustrates an example of a graph set.

FIG. 7 illustrates an example of a stream.

FIG. 12 illustrates a document as a result of calculating a stream.

FIG. 16 shows pseudo code for initialization processing.

FIG. 17 shows pseudo code for the process of combining the single element sub-clusters.

FIG. 19 illustrates pseudo codes for the process of combining clusters.

FIG. 20 is a flowchart for the process of combining clusters.

FIG. 21 illustrates pseudo code for the process of evaluating connections between clusters.

FIG. 24 illustrates other examples of input documents.

DETAILED DESCRIPTION OF THE PREFERRED EMBODIMENTS

Now the present invention will be described with reference to the accompanying drawings. However, it should be noted that the present invention can be implemented in many different forms, so that the present invention should not be understood as limited to the contents described herein. The same element is represented by the same reference number throughout the drawings.

The present invention will be described as a method and system, however, the present invention is also implemented as a medium having recorded thereon a program usable with a computer. Therefore, the present invention is implemented in the form of software, hardware and a combination thereof. A medium storing a program may be any computer-readable medium, such as a hard disk, CD-ROM, optical storage or magnetic storage.

Figure 1:
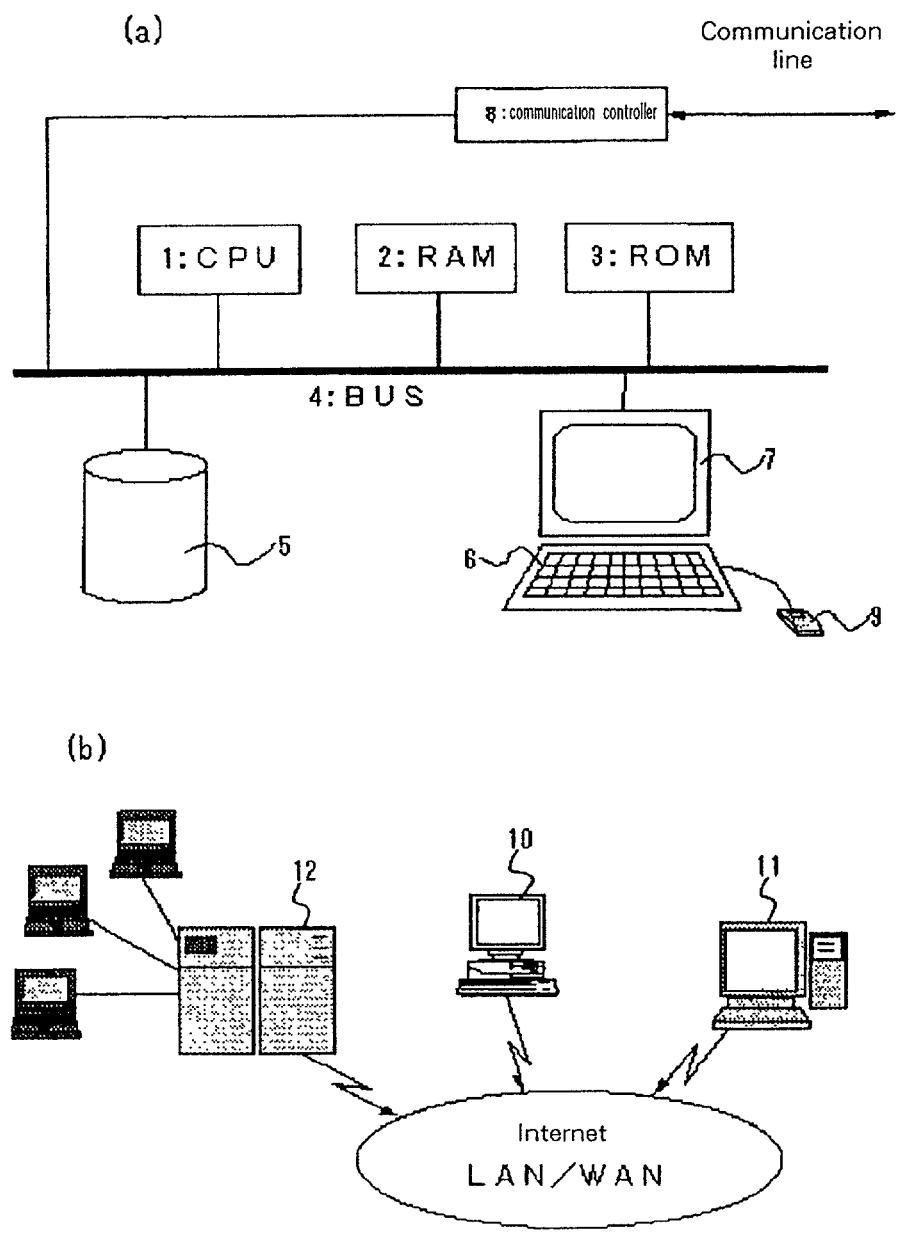

A document processing method according to the present invention is implemented using a typical computer system. The system of the present invention is implemented by a computer network that is composed of a standalone computer system or a plurality of computer system. FIG. 1(a) depicts a short sketch of configuration of a standalone computer, while FIG. 1(b) depicts that of a computer network.

The computer system includes a central processing unit (CPU), main storage 2 (main memory: RAM), nonvolatile storage 3 (ROM), etc., those of which are interconnected by a bus 4. Besides, a coprocessor, image accelerator, cache memory, input-output controller (I/O), etc., may be connected to the bus 4. Furthermore, an external storage 5, data input device 6, display 7, communication controller 8 are connected to the bus 4 via appropriate interfaces. In addition, it goes without saying that hardware resources that are typically provided for a computer may be included.

The external storage 5 is typically a hard disk, however, it may be a semiconductor storage such as a magneto-optical storage, optical storage, flash memory, etc. A read-only storage such as a CD-ROM is used as an external storage when it is used for reading data or programs.

The data input device 6 includes an input device such as a keyboard, and a pointing device such as a mouse 9. Also, an image reader such as a scanner and a voice input device may be provided as a data input device. The display 7 includes a CRT, LCD, plasma display, etc.

When the present invention is implemented for a plurality of computer systems, each computer system may be connected by LAN, WAN or Internet, as shown in FIG. 1(b). A communication line used for these connections may be either a private line or a public line. The computer system includes a variety of computers such as a personal computer 10, work station 11, mainframe computer 12, etc.

In a computer network where a plurality of computers are connected, processing is performed discursively, that is, a part of the program is performed on a user's computer, while the remainder of the program is performed on remote computers. It does not matter on which computer data used by the program is recorded. That is, as long as information about a location of data (i.e., address) is apparent, data or programs may be stored at any place on the computer network. Further, known communication techniques or protocols such as TCP/IP, HTTP, etc., can be used for communication between network computers. A location (i.e., address) of each file (data or a program) recorded on each storage is specified using DNS, URL, etc. It is noted that the term "Internet" herein refers to an intranet and extranet as well. Access to the Internet means access to an intranet and extranet as well. The term "computer network" means a computer network that can be accessed publicly and a network that can only be accessed privately.

The terms that are used herein will be described. Unless specifically referred to, the terms are used in accordance with the following definitions.

The term "object" generically refers to an element that composes a document, such as a character, space, token, text block, etc.

The term "symbol" refers to a set of characters including a blank character, while the term "character" refers to an alphabetic letter such as a, b, c, etc., and an independent symbol set such as a symbol. Hatching parts 21 shown in FIG. 3, i.e., "N", "S", "H", "R" and "R" are an example of a character. Note that 2 byte characters such as Kanji are also included as a character.

Figure 3:
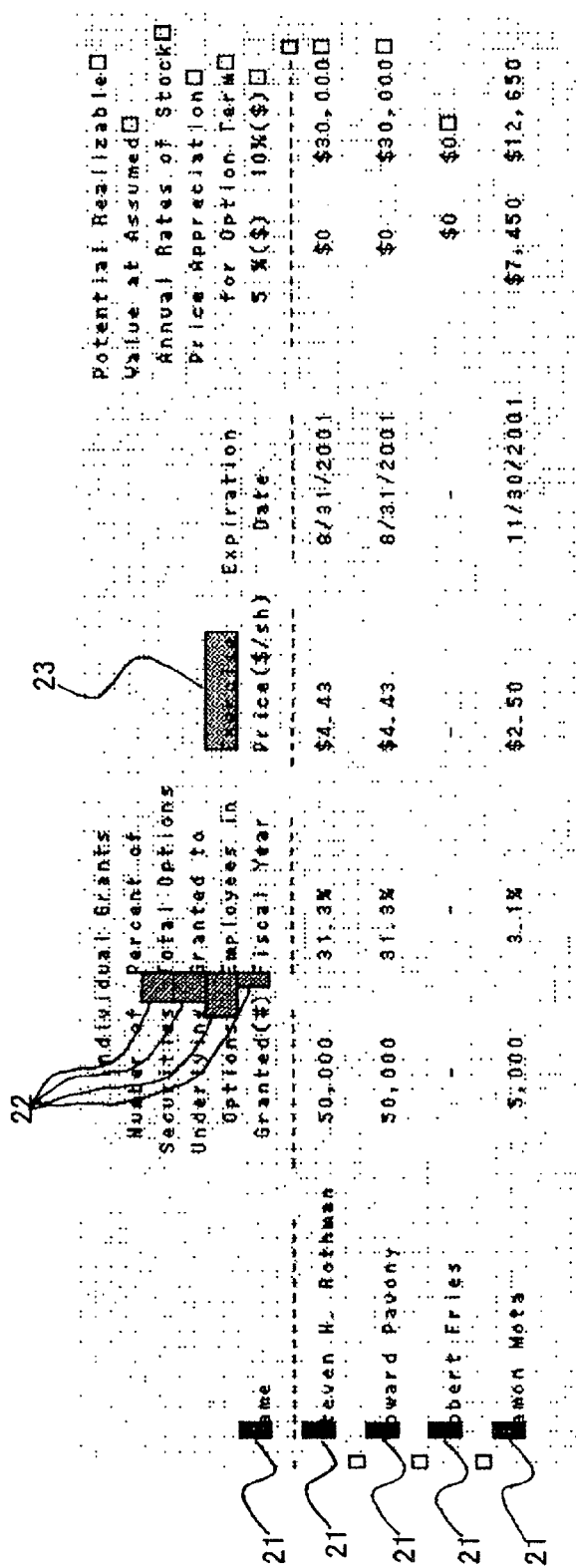
FIG. 3 illustrates an example including a character, space and token.

The term "space" refers to a blank character or consecutive ones in a line. Hatching parts 22 shown in FIG. 3 are an example of a space. It is shown that a two byte blank character is also included. However, it equals two consecutive blank characters composed of one byte.

The term "token" refers to a character or consecutive ones in the same line. Hatching part 23 shown in FIG. 3, i.e., "Exercise" is an example of a token.

The term "text block" refers to a set of tokens. A text block is represented by a rectangular region with a minimum area that includes tokens, wherein its position in the document is described by the upper left and lower right coordinates. Hatching part 24 shown in FIG. 4 is an example of a text block, which includes nine tokens, i.e., "Number", "of", "Securities", "Underlying", "Options", "Granted", "(", "#" and ")". Note that a text block may include a space.

As described later, characters and spaces are used for generating tokens, while tokens are used for generating text blocks. A token, space and text block are recorded and accumulated in a database along with their position coordinates. In this way, a token, a space and a text block are recorded in a database with their position coordinates, whereby a position retrieval of these objects in a document is performed quickly.

In addition, the present invention employs the concepts of "graph", "graph set", "single element sub-cluster" and "perplexity" for abstraction of objects.

Figure 5:
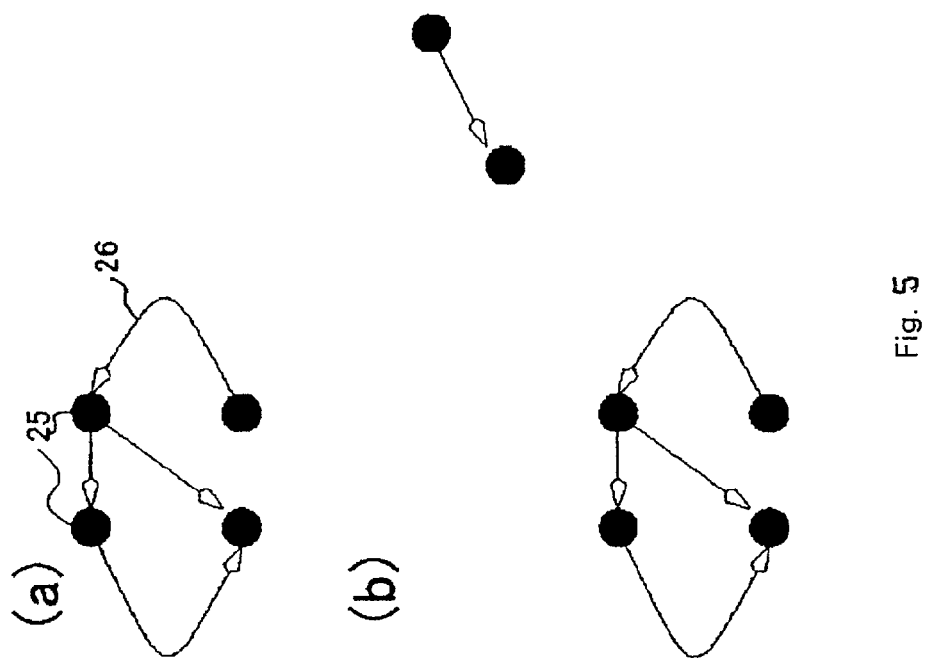

The term "graph" refers to a set of a node (dot) and an arc (side). FIG. 5(a) depicts an example of a graph. Nodes 25 are connected by a directed arc 26. The starting point of the arc 26 is a source, while the end point is a sink.

The term "graph set" refers to a set of graphs. FIG. 5(b) depicts an example of a graph set.

Figure 6:
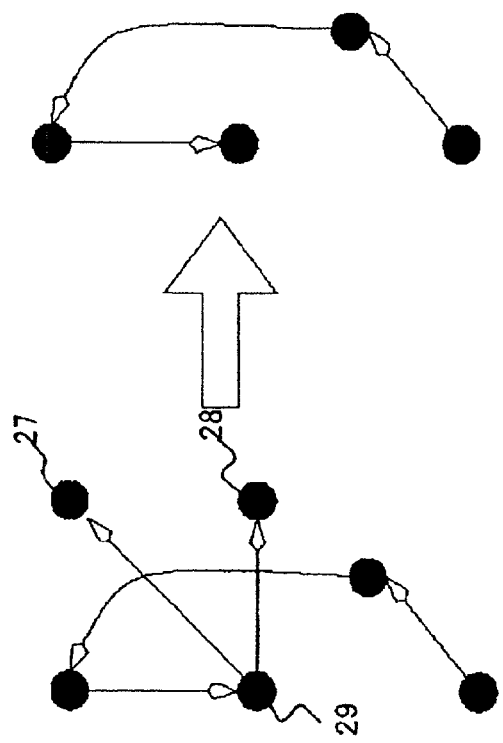
FIG. 6 illustrates an example of a single element sub-cluster.

The term "single element sub-cluster" refers to a subgraph of a graph, wherein the number of arcs going out of each node (i.e., output order) and the number of arcs entering each node (i.e., input order) are both one. FIG. 6 depicts an example of a single element sub-cluster. A single element sub-cluster, which is depicted on the right side of the arrow is extracted from a graph shown on the left side of the arrow. As for two nodes 27 and 28, their input order is one, whereas their source, i.e., a node 29 has output order 2, thus these nodes 27 and 28 are excluded upon configuring the single element sub-cluster.

A degree of links (i.e., the number of arcs entering a node) associated with nodes composing a graph set or graph is represented by perplexity. The term "perplexity" refers to a sum of the number of links (arcs) that go out of source nodes and the number of links (arcs) that enter sink nodes. Therefore, the perplexity of a single element sub-cluster is two. A maximum perplexity of some graph set is a maximum perplexity for all arcs in that graph set.

The present invention represents documents using these concepts regarding a graph. Each node corresponds to a text block, while each arc corresponds to a link (i.e., connection relation) between text blocks. A sink represents a text block that may be connected from a source (i.e., a node corresponding to a starting point of an arc). When a plurality of arcs go out of a single text block, this text block may be connected to a plurality of text blocks.

In addition, the present invention generates a stream by grouping spaces just like text blocks. The term "stream" refers to a graph that is composed of spaces (nodes) in each line in a document that are located right above and below each other. The length of a stream is represented by the number of blank lines that extend vertically. FIG. 7 depicts an example of a stream. As is shown, a space 30 composes a stream with the length of five by its vertical extension.

Now a document processing method will be described according to an embodiment of the present invention. First, a document to be processed is input to the aforementioned system. A document may be input by using a reader such as a scanner, or may be input as a document that is already computerized. However, even a computerized document need not be highly structured, as long as it is a document laid out by means of blank characters and tabs, etc. FIG. 2 depicts an example of a document input to the present system. The document shown in FIG. 2 is a single file composed of characters such as letters. It is noted that a document is defined as a set of symbols such as letters and blanks, which are specified independently using a pair of coordinates. In FIG. 2, let's define that the upper left position is (0, 0), wherein the x coordinate index increases by one per character in the horizontal direction (x direction), while the y coordinate index increases by one per line in the downward direction (y direction). For example, a coordinate of "N" of the text "Name" displayed on the left in the sixth line is (2, 5). The number of lines in a document is the maximum value (maxy) of y, while the number of symbols in a line is the maximum value (maxx) of x. In this way, characters are recorded in the database one by one and associated with a coordinate. Alternatively, a document may be input such that symbols are read from the beginning of a line one by one in the right direction in each line, in cooperation with processing for generating tokens described below.

Figure 8:
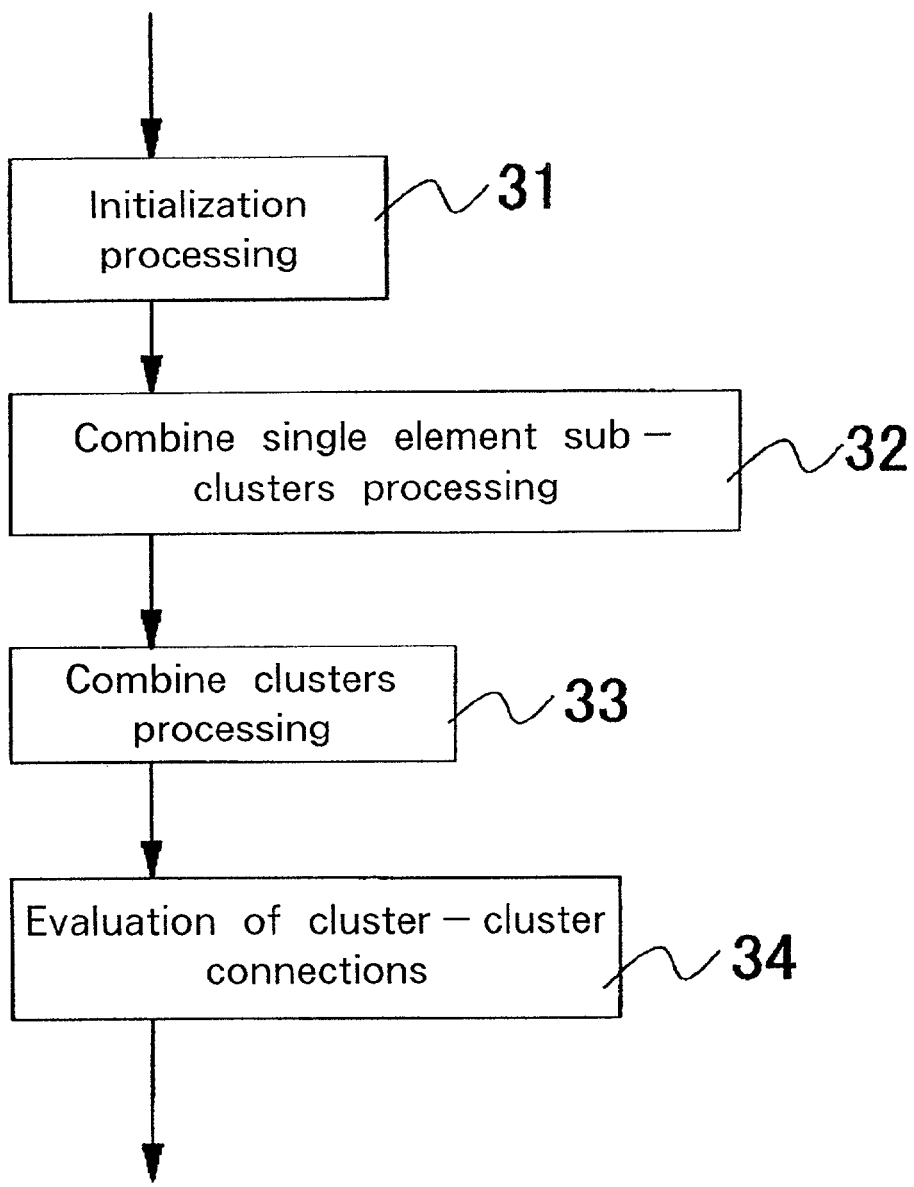
FIG. 8 is a flowchart showing an outline of the processing according to the present embodiment.

FIG. 8 is a flowchart showing an outline of the processing according to the present embodiment. After the input of document data, the initialization processing is performed (step 31), then the combine single element sub-clusters processing is performed (step 32). Thereafter, clusters that have a unique link are combined (step 33), then evaluating the links between clusters that ultimately remained to generate text blocks (step 34).

Now the initialization processing will be described. The initialization processing is performed in four steps. The first step is a step for generating tokens. The second step is a step for generating streams. The third step is a step for generating initial text blocks, and the fourth step is a step for generating initial links.

Figure 9:
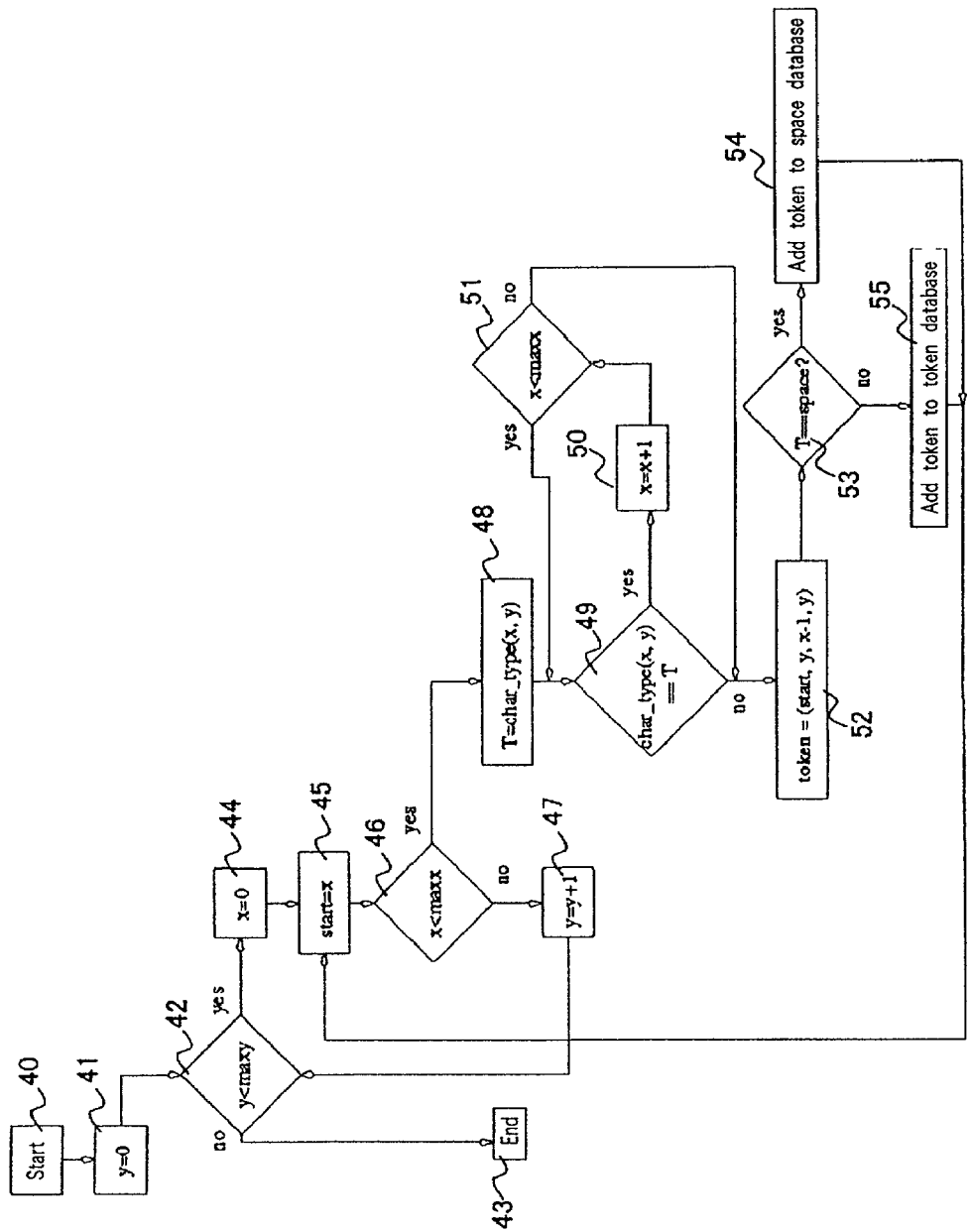
FIG. 9 is a flowchart showing an example of the step for generating tokens.

FIG. 9 is a flowchart showing an example of the step for generating tokens. The process starts at step 40. The initialization is performed by assigning 0 to the index y in the line direction (step 41), then it is determined whether y is smaller than the maximum number of lines (maxy) (step 42). If the result of step 42 is no, the process terminates (step 43). Otherwise, the following process is performed. Note that a symbol "=" in the drawings means an assignment symbol.

Also, the initialization is performed by assigning 0 to the index x in the column direction (step 44), then a variable 'start' is assigned x (step 45). Then, it is determined whether x is smaller than the maximum number of characters (maxx) (step 46). If the result of step 46 is no, y is increased by one (step 47), then returning to step 42 to proceed to the processing of the next line. Otherwise, the following process is performed (i.e., generating a token of characters in the y-th line).

First, a return value of the function char_type(x,y) is assigned to a variable T (step 48). The function char_type (x,y) is a function that returns a character type of a symbol located at a coordinate (x,y) as a return value. In the present embodiment, an alphabet, numeric, punctuation and space are considered as a character type. Note that when processing a language such as Japanese other than English, characters such as Kanji may be of course considered.

Next, it is determined whether the return value of char_type(x,y) is equal to the variable T (step 49). Note that a symbol "==" in the drawings is a symbol for determining whether values of both sides match or not. For the first loop, the determination is yes, thus the process proceeds to step 50, where x is incremented by one. It is determined whether x is less than maxx (step 51); if yes, the process goes back to step 49. Since x was increased by one, step 49 checks the type of an adjoining symbol in the y-th line. If the symbol type is the same (i.e., step 49 is yes), a loop of steps 50 and 51 is repeated insofar as x does not exceed maxx, until a different type of symbol is detected. When a different type of symbol is detected (step 49 is no), the process proceeds to step 52, then the coordinates of consecutive symbols having the same type are input to a variable token (step 52). On the other hand, if the determination at step 51 is no (i.e., the process proceeds to the line end), the process goes to step 52 as well (step 51).

Next, it is determined whether the character type is a space or not (step 53). If it is a space, the variable token is added to a space database (step 54). Otherwise, the variable token is added to a token database (step 55). Thereafter, the process proceeds to step 45 to repeat the aforementioned processing.

Figure 10:
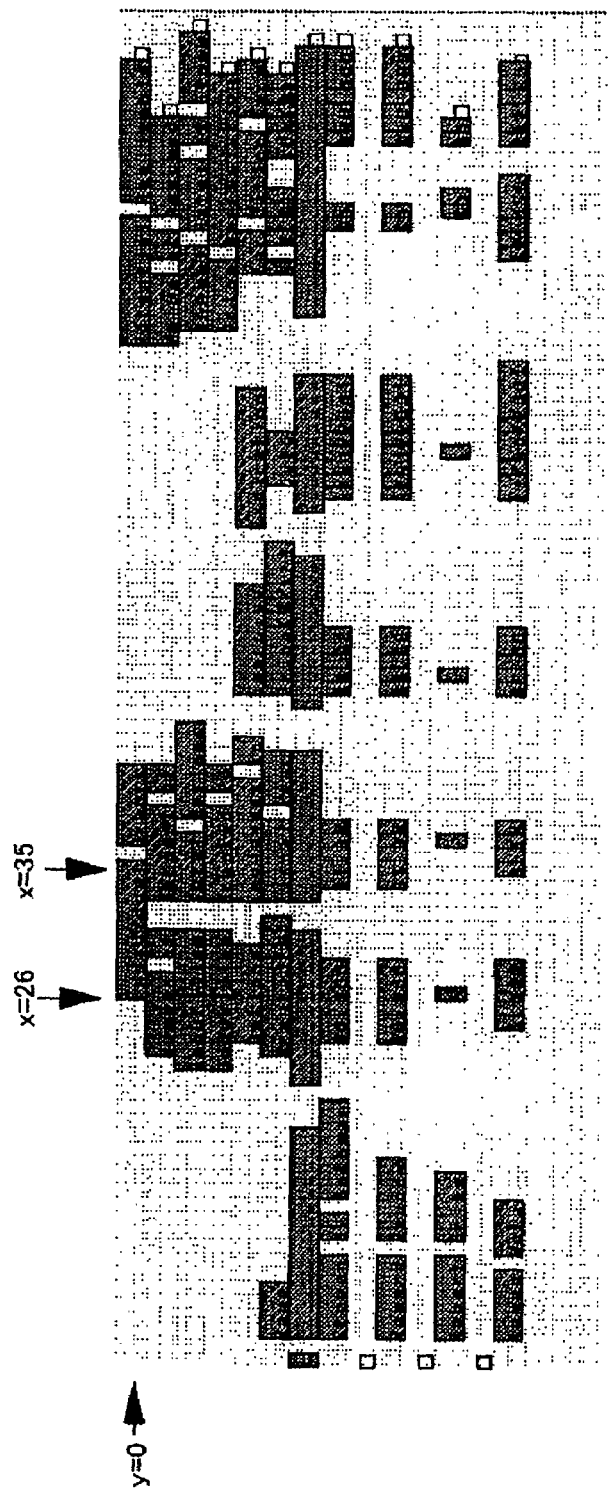
FIG. 10 illustrates an example of a document after the tokenizing processing.

In this way, the processing for tokenizing the input document is performed. As mentioned above, a space is detected in parallel with tokenizing. FIG. 10 depicts an example of a document after the tokenizing processing. For example, focusing on the 0th line, a space is detected in the range of x=0 to 25, thus it is recorded in the space database as one space (token). As for "i", "n", "d", "i", "v", "i", "d", "u", "a", "l" in the range of x=26 to 35, they are the same type of characters, thus the token "individual" is generated and recorded in the token database. Note that the char_type function was used here as a technique for generating tokens, however, other techniques may be used to generate tokens from individual characters.

Figure 11:
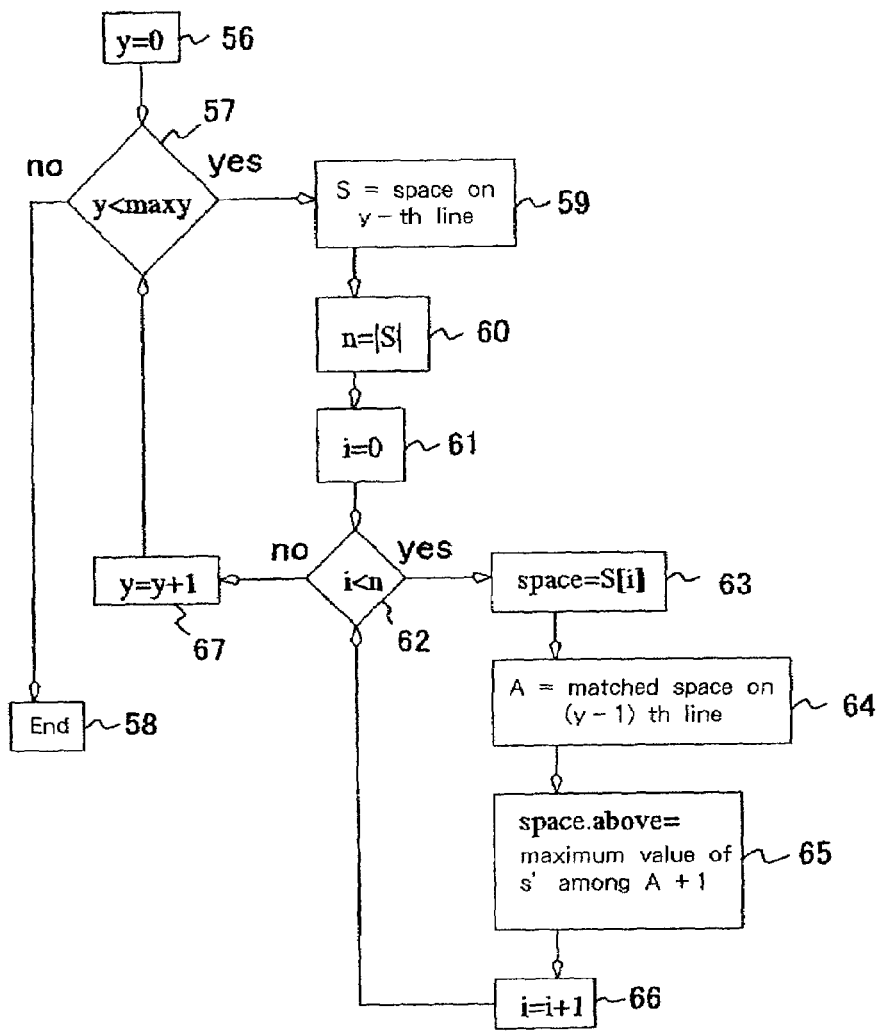
FIG. 11 is a flowchart showing an example of the method for calculating a stream size.

Next, the technique for generating streams will be described. A stream is calculated using a space database. FIG. 11 is a flowchart showing an example of the method for calculating stream size. The initialization is performed by assigning 0 to the index y in the line direction (step 56), then it is determined whether y is smaller than the maximum number of lines (maxy) (step 57). If the result of step 57 is no, the process terminates (step 58). Otherwise, the following process is performed.

A space that exists in the y-th line is assigned to a variable S (step 59), while a number of S represented by |S| is assigned to a variable n (step 60). Note that |O| is a scalar value representing a number of object O. A variable S is a vector quantity, wherein a space (object) is assigned to each element of the vector. The sameness is applicable to variables A and T, as well.

A variable i is initialized by assigning 0 (step 61), then it is determined whether i is smaller than n (step 62). If the determination of step 62 is yes, the i-th space S[i] is assigned to a variable 'space' (step 63), while a space in (y−1)th line that matches to S[i] in terms of position in x direction is assigned to a variable A (step 64). Then, a maximum number of spaces above any space s' among the space A (max s'.above) plus 1 is assigned to a variable 'space.above' (step 65). Note that a variable 's.above' records the number of spaces above the space 's'. That is, according to the above processing, a maximum number of upper spaces (max s'.above) among elements s' of a vector quantity A, which match to the space 'space' in terms of position in x direction, plus one is assigned to the number of spaces that exist above the space 'space'. As a result, the 'space.above' represents the number of consecutive spaces (lines) that exist above the 'space'.

Thereafter, i is incremented by one (step 66), then the process returns to step 62. In this way, the number of spaces that exist above each space (S) in the y-th line is calculated. This operation is repeated up to maxy (step 67).

According to the above means, the number of spaces that exist above any space is calculated, wherein a predetermined threshold is exceeded, then it is determined to be a stream and recorded in a stream database. FIG. 12 depicts a document as a result of calculating a stream. Spaces 68 shown by a hatching block compose the stream.

Figure 13:
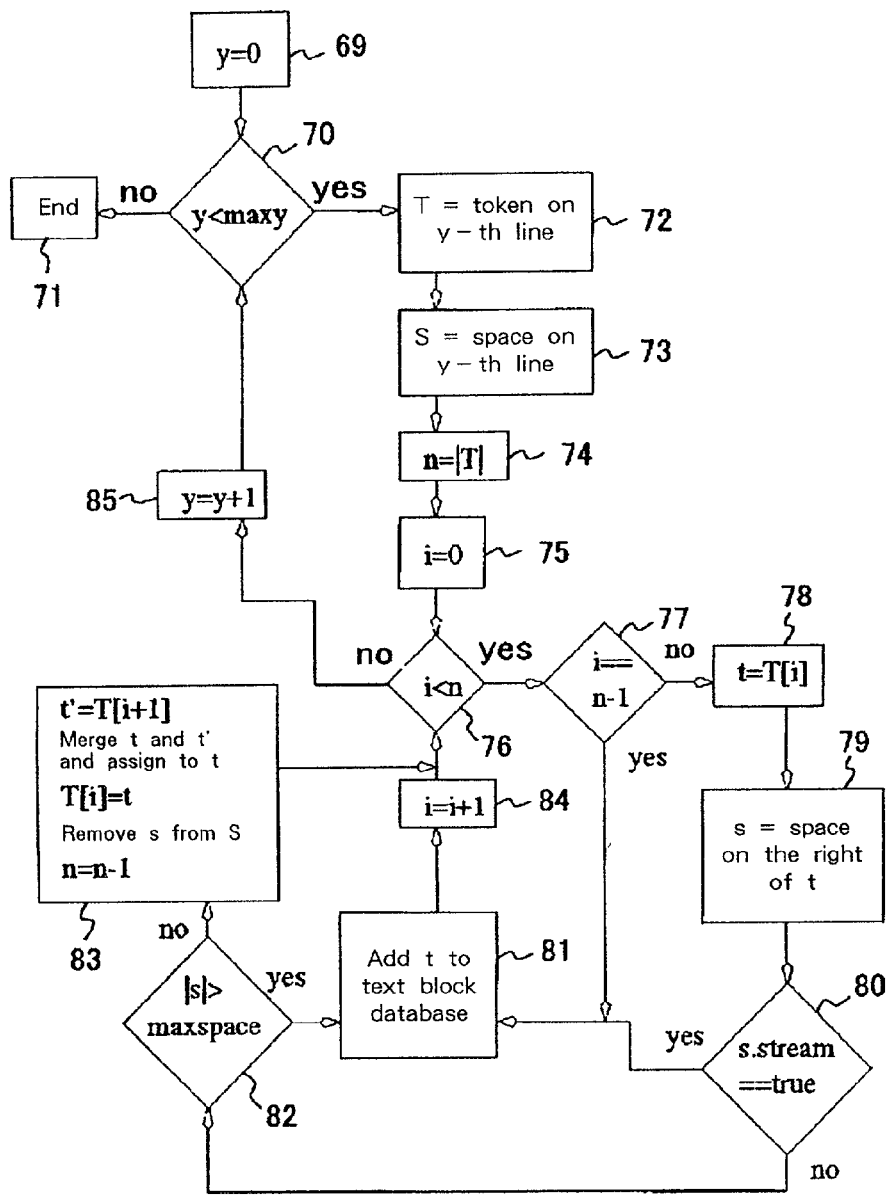
FIG. 13 is a flowchart showing an example of the method for calculating an initial text block.

Next, the method for generating initial text blocks will be described. A initial text block is calculated using a token database, space database and stream database. FIG. 13 is a flowchart showing an example of the method for calculating an initial text block. The initialization is performed by assigning 0 to the index y in the line direction (step 69), then it is determined whether y is smaller than the maximum number of lines (maxy) (step 70). If the result of step 70 is no, the process terminates (step 71). Otherwise, the following process is performed.

A token that exists in the y-th line is assigned to a variable T (step 72), while a space that exists on the y-th line is assigned to a variable S (step 73). Then, a number of T represented by |T| is assigned to a variable n (step 74). As mentioned above, a variable T is a vector quantity, wherein a token (object) is assigned to each element of the vector.

A variable i is initialized by assigning 0 (step 75), then it is determined whether i is smaller than n (step 76). If the determination of step 76 is yes, it is determined whether i equals n−1 (step 77). That is, it is determined whether the current i-th token is the last token in the y-th line. If the determination of step 77 is no, the i-th token T[i] is assigned to a variable t (step 78). Then, a space located on the right of token t is assigned to a variable s (step 79). Then, it is determined whether a space s (that is located on the right of token t) belongs to a stream (step 80). Note that s.stream function is a function that returns a new value when space s belongs to a stream.

If the determination of step 80 is yes (i.e., a space located on the right of token t is a stream), token t is added to a text block database (step 81). If the determination of step 77 is yes (i.e., the token is the last token in the y-th line), the process proceeds to step 81.

On the other hand, if the determination of step 80 is no, it is determined whether the size of space s, that is |s|, is greater than a predetermined maximum space value (maxspace) (step 82). If the determination of step 82 is yes, the process proceeds to step 81, wherein token t is added to the text block database. If the determination of step 82 is no, the (i+1)th token T[i+1] is assigned to token t', furthermore, tokens t and t' are merged to form token t. Moreover, token t is assigned to token T[i], then space s is removed from a space string S, and n is decremented by one (step 83). That is, tokens that are not a stream and located on both sides of a blank are merged. Thereafter, the process proceeds to step 76 to repeat the aforementioned processing.

After a token is recorded to the text block database, i is incremented by one (step 84), then the process proceeds to step 76 to repeat the aforementioned processing.

If the determination of step 76 is no (i.e., the merge processing is finished for tokens in a line), y is incremented by one (step 85), then the process returns to step 70 to repeat the aforementioned processing.

That is, until the end of a stream or a line is detected by the aforementioned processing, a token in a line is merged. The tokens merged like this are recorded in the text block database as an initial text block.

Figure 14:
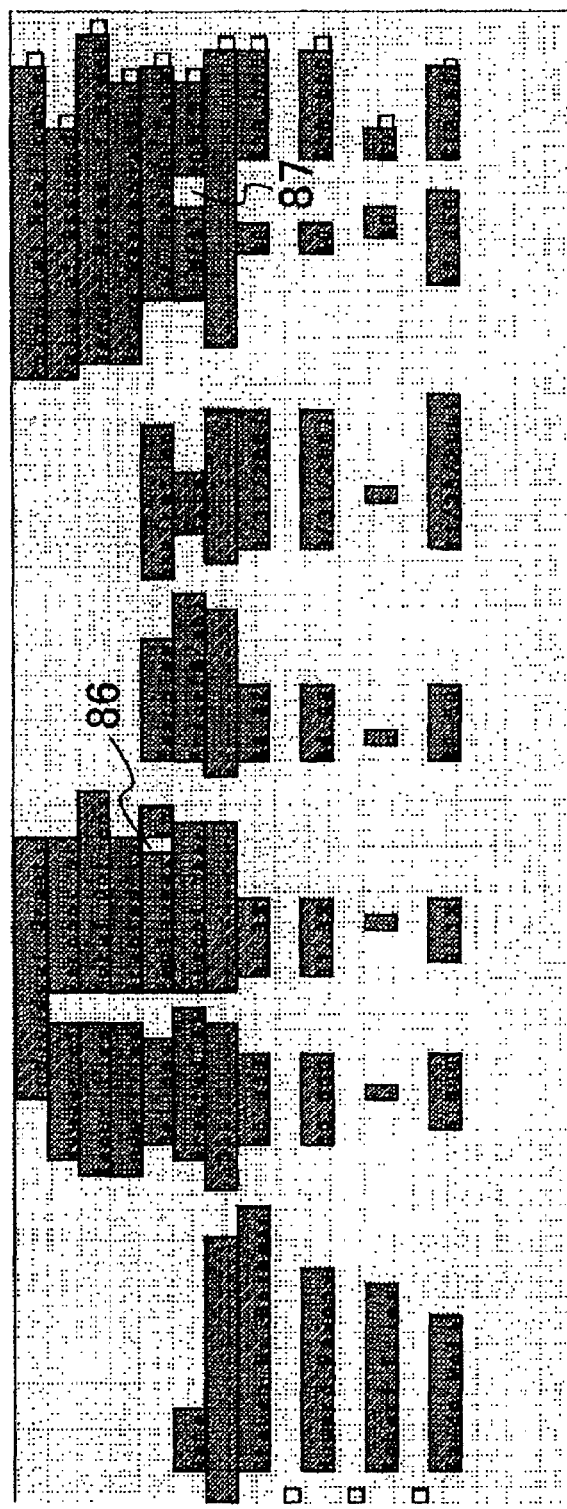
FIG. 14 is a diagram showing an example of a document at the stage when the initial text blocks are generated.

FIG. 14 is a diagram showing an example of a document at the stage when the initial text blocks are generated. As is evident from the aforementioned flowchart, the text blocks at this stage remain the merge of tokens in a line, therefore, the depth is one. Also, as shown in FIG. 14, a space as a part of the stream, such as an area 86 between "Employees" and "in", remains between the initial text blocks. Further, like an area 87, tokens may not be merged due to a space that is not a stream. That is, this is the case where the maximum space value (maxspace) is exceeded as a result of determination step 82.

Figure 15:
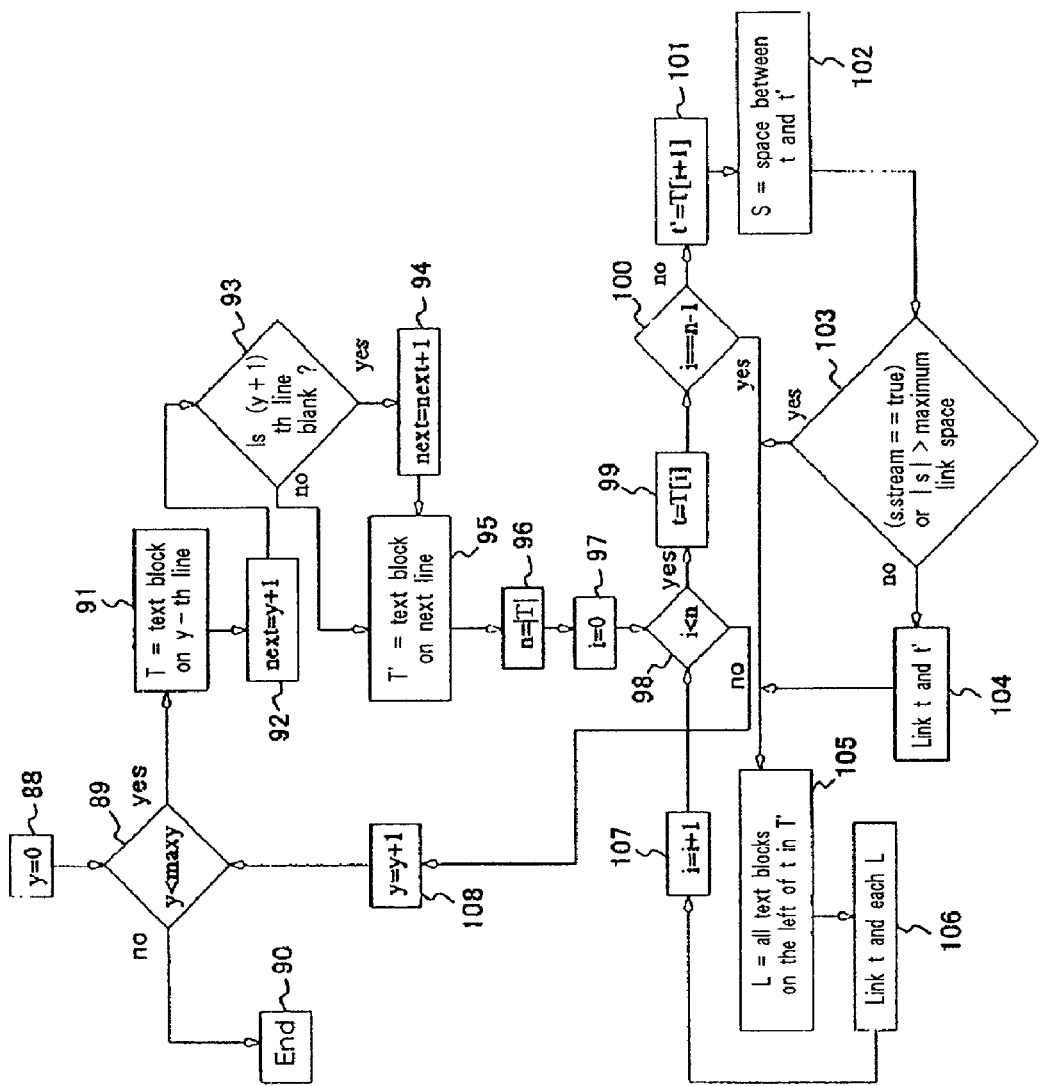
FIG. 15 is a flowchart showing an example of the initial link generation.

Next, the initial links are generated. Generation of the initial links is calculated using the text block database and the space database. FIG. 15 is a flowchart showing an example of the initial link generation. The initialization is performed by assigning 0 to the index y in the line direction (step 88), then it is determined whether y is smaller than the maximum number of lines (maxy) (step 89). If the result of step 89 is no, the process terminates (step 90). Otherwise, the following process is performed.

A text block that exists in the y-th line is assigned to a variable T (step 91), while y+1 is assigned to a variable 'next' (step 92). Then, it is determined whether the 'next' line is empty (step 93). If so, the variable 'next' is incremented by one (step 94). Otherwise, the process proceed to the next step 95. In step 95, the text blocks that exist on the 'next' line are assigned to a variable T'. Then, the number of T, that is |T|, is assigned to a variable n (step 96).

A variable i is initialized by assigning 0 (step 97), then it is determined whether i is smaller than n (step 98). If the determination of step 98 is yes, the i-th text block T[i] is assigned to a variable t (step 99), then it is determined whether i equals n−1 (step 100). That is, it is determined whether the current i-th text block is the last token in the y-th line. If the determination of step 100 is no, the (i+1)th token T[i+1] is assigned to a variable t' (step 101), then a space located between t and t' is assigned to a variable s (step 102). Then, it is determined whether s is a stream (i.e., s.stream==true), or the size of s, i.e., |S| exceeds the maximum link space (step 103). If the determination of step 103 is no, a link is generated between t and t' (step 104). That is, according to step 99 through step 104, if there is a space that is not a stream between adjoining text blocks in the same line, and the size (length) of that space is smaller than the maximum link space, then a link is formed between the adjoining text blocks.

Next, all text blocks in T' that exist on the left side of t are assigned to a variable L (step 105). Then, a link is generated between t and each text block that composes L (step 106). That is, a link is formed to all the text blocks that exist in the next line of the text block t (if the next line is a blank line, the further next line) and are located on the left of t. If the determination of step 100 or step 103 is yes (i.e., there is no text block on the right that adjoins the text block t, or a stream or space is too big to form a link), the process proceeds to step 105.

After a link is formed as described above, i is incremented by one (step 107), then the process proceeds to step 98 to repeat the aforementioned processing. If the determination of step 98 is no (when the link generation processing completed for the text blocks in a line), y is incremented (step 108), then the process returns to step 89 to repeat the aforementioned processing.

Thus, according to the aforementioned processing, a link is formed between the initial text blocks. The criteria of link generation are that a space between adjoining text blocks is not a stream, that a space does not exceed a predetermined maximum link space, and that a position of the text block (sink) corresponding to the end point of the link is located in the next line and on the left side of the text block (source) corresponding to the starting point of the link. If these conditions are satisfied, an initial link is generated automatically. Needless to say, an initial link is recorded in the database along with information about text blocks corresponding to a source and sink of a link.

The initialization is completed in this way. FIG. 16 shows pseudo codes for initialization processing. In the drawings showing the pseudo codes, the numbers shown on the left side represent the line number.

First, document data 'doc' is input to the tokenizing function 'tokenize' to get 'tokens' and 'spaces' (line number 1). Then, document data 'doc' is input to the stream function 'stream' to get 'streams' (line number 2). 'Tokens', 'spaces' and 'streams' are input to the initial text block generation function 'get_initial_blocks' to get initial text blocks 'text_blocks' (line number 3). Text_blocks are input to the initial link generation function 'get_initial_links' to get initial links 'links' (line number 4). Then, the initial text blocks 'text_blocks' and the initial links 'links' are stored as a document graph 'document_graph' (line number 5). The document graph is a graph set, wherein the 'text_blocks' correspond to nodes and 'links' correspond to arcs.

Figure 18:
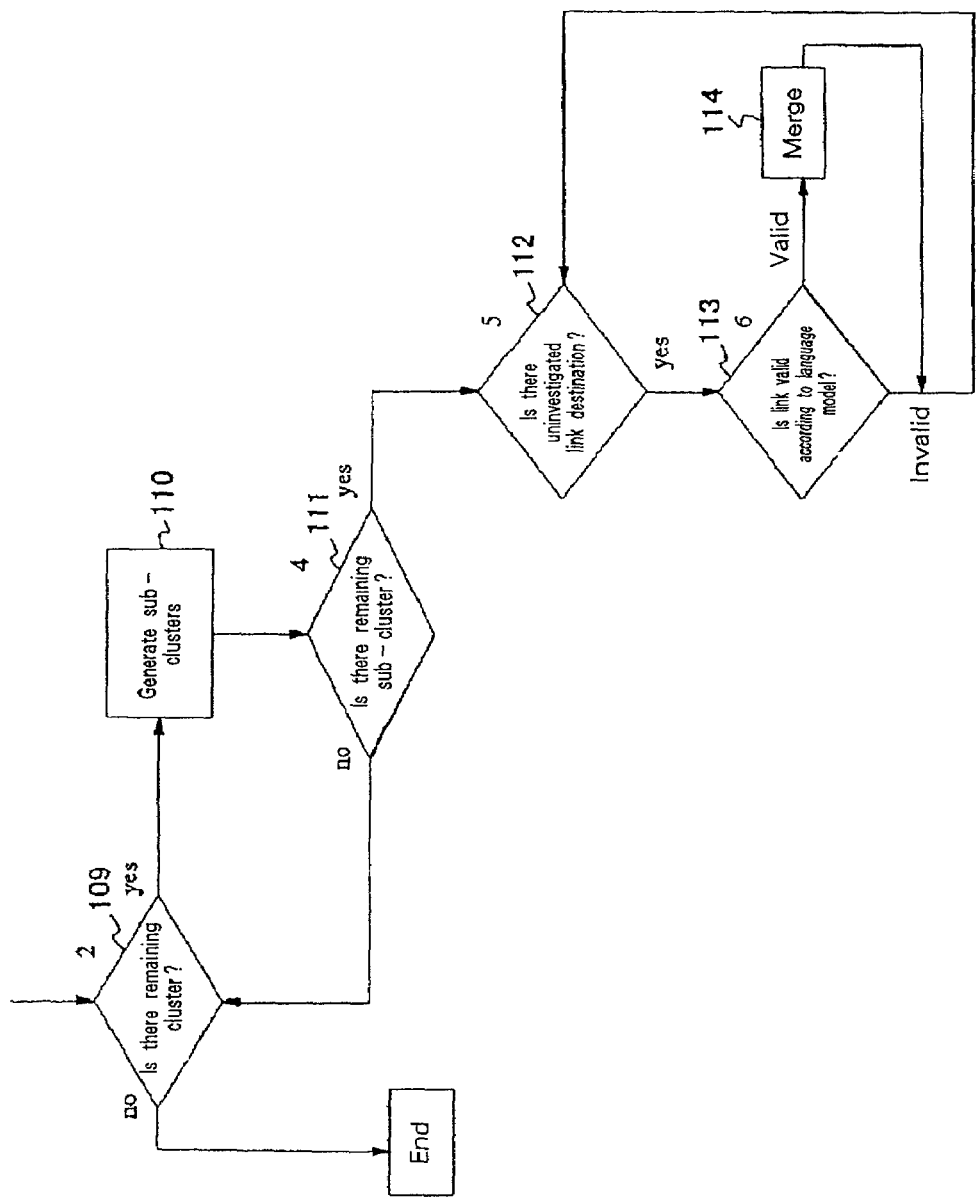
FIG. 18 is a flowchart illustrating the process of combining the single element sub-clusters.

Next, the combine single element sub-clusters processing (step 32) will be described. FIG. 17 shows pseudo codes for the processing of combining the single element sub-clusters, while FIG. 18 shows its flowchart.

First, a document is clustered using the cluster function (line number 1). The data clustered are stored in the cluster_set. Clustering of a document is performed by retrieving a graph from text blocks generated in the initialization processing and documents represented by links. A set of text blocks combined by a link corresponds to a graph.

Then, for all clusters c included in the cluster_set, sub-clustering is performed using the sub-cluster function. The extracted sub-clusters are stored in the sub_cluster_set (line number 2, 3; step 109, 110). The sub-clustering is an operation for extracting a single element sub-cluster from a cluster. For example, this extraction is performed by checking for each node whether it satisfies the condition for both the input order and output order of an arc (link) becoming one (i.e., the definition of a single element sub-cluster).

Next, for all sub-clusters s included in the sub_cluster_set, the validity of links included in each sub-cluster s is evaluated using a language model (line number 4 to 6; steps 111 to 113). The validity of links is determined by evaluating whether a text block at the starting point (source) of the link and a text block at the end point (sink) of the link appear with high probability in a language model. As a language model, N gram model is used, for example. However, other models may be used. If the evaluation result is reasonable, the text blocks of the source and sink of the link are merged (line number 6; step 114).

Next, the combine clusters processing will be described (step 33). FIG. 19 shows pseudo codes for the processing of combining clusters, while FIG. 20 shows its flowchart. This processing is performed in ascending order of perplexity.

First, the perplexity is assigned 3 (line number 1), then the maximum perplexity is acquired (line number 2). Then, if the perplexity is less than the maximum perplexity, the following processing is performed (line number 3).

A document is clustered using the cluster function (line number 5), then for all clusters c included in the cluster_set, a perplexity of links included in each cluster c is checked (line number 6 to 8; steps 115 to 116). If the perplexity of the link is smaller than that of the current loop (line number 8; step 116), it is determined whether the link is uniquely valid (line number 9; step 117). If the determination is yes, the text blocks of the source and sink of the link are merged (line number 9; step 118). Note that the link is uniquely valid means that there is a unique definite link. For example, when a link between "number" and "of" and a link between "of" and "of" coexist, the link between "of" and "of" is impossible from the language model. In this case, the link between "of" and "of" is removed, thereby selecting the link between "number" and "of". Then, "number" and "of" are merged to generate a new text block "number of".

Figure 22:
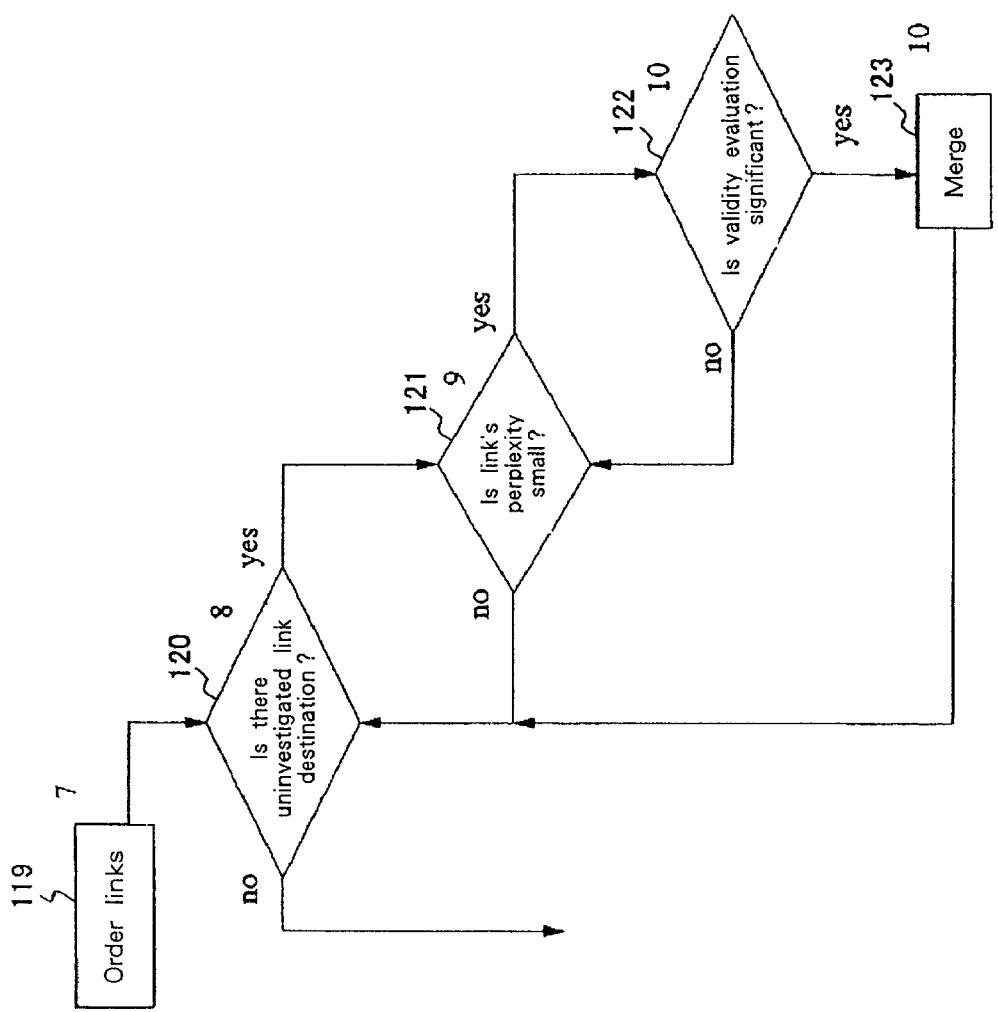
FIG. 22 is a flowchart for the process of evaluating connections between clusters.

Next, the step for evaluating cluster-cluster connections will be described (step 34). FIG. 21 shows pseudo code for the processing of evaluating connections between clusters, while FIG. 22 is its flowchart. This processing is similar to the combine clusters processing (step 33). In step 33, if there is a unique selectable link as a result of evaluation of a plurality of links, this link is selected. By contrast, here will be described the processing where a plurality of links exist, wherein any of them is selectable. Now the explanation for the same matters as step 33 will be omitted.

In step 34, for all clusters c included in the cluster_set, links included in each cluster c are ordered (line number 7; step 119). For each link included in the ordered links (ordered_links) (line number 8; step 120), the perplexity of the link is checked (line number 9; step 121), then it is determined whether there is a significant difference among validity evaluation of links (line number 10; step 122). A probability of occurrence based on a language model may be used for evaluating the validity of links, for example. The higher the probability of the occurrence, the higher the validity of connection. Needless to say, other methods for validity evaluation and determining a significant difference may be used. If the determination is yes, the text blocks of the source and sink of the link are merged (line number 10; step 123). On the other hand, if the significant difference is not found, the link remains coexisting.

Figure 23:
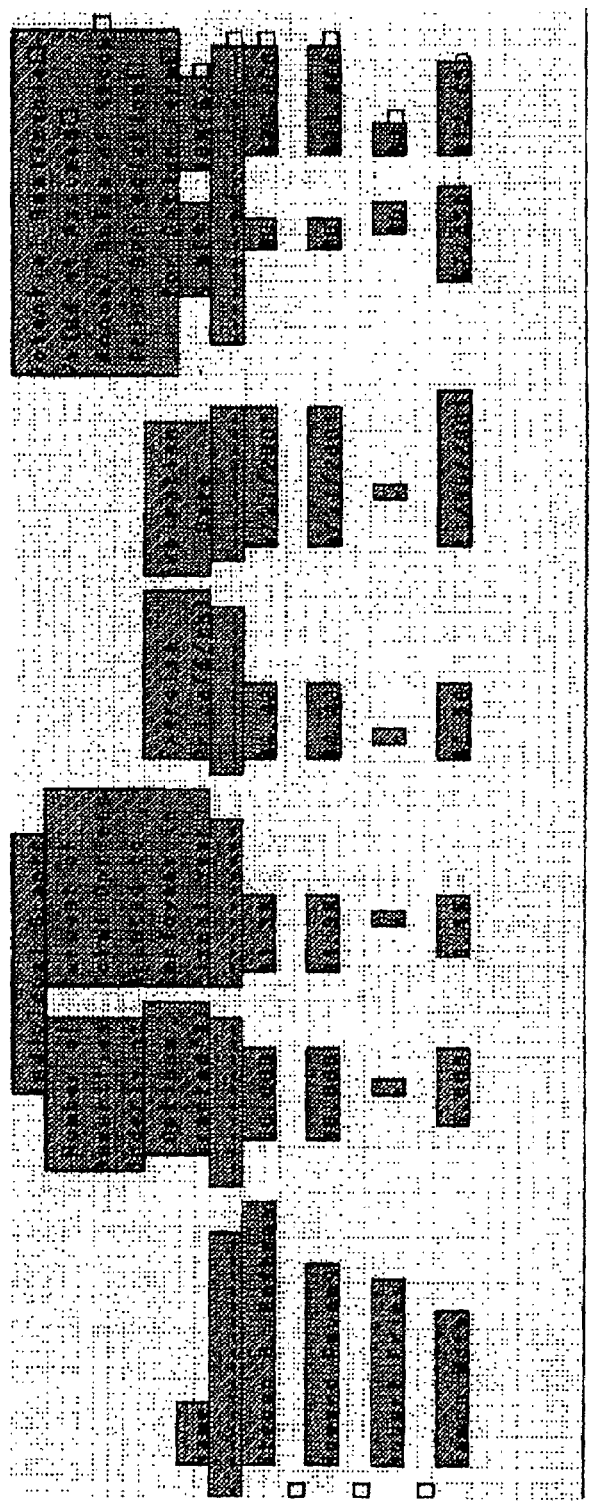
FIG. 23 is a diagram illustrating an example of an output after final processing.

In this way, meaningful test blocks are automatically generated from a document that is laid out by blanks. FIG. 23 is a diagram showing an example of an output after the final processing. There are displayed text blocks that are obtained by merging connections that are determined to be valid by the language model. As is shown, the text blocks according to the processing of the present invention are output maintaining spatial coordinates information of the original document. That is, the final positions of text blocks are specified by the position coordinates of the document. For example, the position is specified by the upper left and lower right coordinates of the text block. In this way, the spatial information of the original document is maintained and the texts in each text block is to have meaningful contents that are assured by the language model. Hence, providing the processing of the present invention as the preprocessing, an advanced natural language processing (e.g., text mining, machine translation) is applied without lacking the contents of the original document. Furthermore, the document processing method according to the present generates text blocks using spatial position information and spaces, thus it is easily applicable to a document with a complicated layout. On this basis, it is possible to extend the range of documents subject to application, and provide more versatile document processing.

The present invention has been described with reference to the preferred embodiments, however, it is not limited to those embodiments and various modifications and variations are possible without departing from the spirit and range of the present invention.

For example, an input document includes not only a table as used in the aforementioned embodiment, but also a multiple column display document such as a double column, a document with a list or a title, a double space document, a table document with multi-column cells or multi-row cells, a table document with sub-cells, or a document such as an elliptical list or table. FIG. 24 depicts examples of applicable documents.

Also, the present invention is applicable to a document including vertical writing such as Japanese. While the aforementioned embodiments are described with respect to horizontal writing, it is easy to change an algorithm to apply to vertical writing. It is also possible to apply it to a document with a mix of horizontal writing and vertical writing.

Further, when an association between documents is complicated such as when one text is associated with a plurality of texts or when a plurality of texts are associated with one text, the present invention allows accurate comprehension. In this case, recording is performed in a condition where a plurality of links enter (or go out of) one object (text block).

Moreover, the aforementioned embodiment contains all the steps of combine text blocks processing for a single element sub-cluster (step 32), combine clusters processing (step 33), and evaluation of cluster-cluster connections (step 34). However, step 32 or step 34 is not essential. An input document may not include a single element sub-cluster, or a unique link likelihood may not be found. In this case, using the evaluation of connections of text blocks, the same document output as the aforementioned embodiment can be obtained. However, efficiency of the processing is increased using step 32 and 33.

It is an advantage of the invention that there is provided a technique for extracting a meaningful text block from a document where features such as a table, an itemized list, multiple columns, etc., are arbitrarily laid out.

What is claimed is:

1. A document processing method for extracting a text block from a document in a document processing system, wherein characters are laid out using blank characters, tabs or any other spaces, comprising the steps of:
   generating an object including characters, marks, blank characters and other symbols from the document;
   generating a connection candidate between the objects; and
   evaluating validity of connection of the connection candidate using a language model;
wherein the step of generating an object comprises:
   acquiring a symbol at every spatial coordinate, and associating it with the coordinate in the document;
   determining a type of the symbol in a line of the document and generating a token composed of one or consecutive letters, symbols or other characters or a space composed of one or consecutive blank characters;
   determining an adjacency relation of the space in the vertical direction and generating a stream composed of spaces that extend over a plurality of lines; and determining a positional relation between the token and the stream and generating an initial text block that includes the token and blank characters.

2. The document processing method according to claim 1, further comprising the steps of:
   determining if a connection of the connection candidate is valid; and
   combining the objects corresponding to a source and destination of the connection candidate, if it is determined that the connection of the connection candidate is valid.

3. The document processing method according to claim 1, wherein the object generated is associated with a coordinate indicating a spatial position of the document.

4. The document processing method according to claim 3, wherein the text block is generated by combining the objects, wherein the text block is defined as a rectangular region with a minimum area that includes the objects, wherein the position of the text block is specified by the coordinates of opposing corners of the rectangular region in the document.

5. The document processing method according to claim 1, wherein the connection candidate between the objects is a connection with an object that adjoins the source object on the right side or a connection with an object that is located in the next line and on the left side of the source object.

6. The document processing method according to claim 1 wherein the language model is an N-gram model.

7. The document processing method according to claim 1, wherein the step of generating a token or space comprises:
   recording the symbols as a token composed of consecutive characters, if it is determined that the type of symbol is not a blank character and the type of an adjoining symbol in the line is the same;
   recording the symbol as one or consecutive spaces if it is determined that the type of symbol is a blank character; and
wherein the step of generating a stream comprises:
recording the spaces as a stream if it is determined that the spaces are adjoining over different lines in the vertical direction; and
wherein the step of generating an object comprises:
combining the two tokens and the space between them as an initial text block if a space interposed between two tokens in a line is not a stream.

8. The document processing method according to claim 1, further comprising:
   generating all the initial text blocks and their connection candidates;
   extracting initial text blocks of a single element and connection candidates from all the initial text blocks and connection candidates;
   determining validity of connection of the initial text blocks of a single element and connection candidates using a language model; and
   combining the initial text blocks of a single element if it is determined that the validity of connection is valid.

9. The document processing method according to claim 1, further comprising:
   if there is only a single connection candidate between the objects, the initial text blocks, or the text blocks combined thereof, combining them without determining validity of connection using a language model.

10. A document processing system for extracting a text block from a document, wherein characters are laid out using blank characters, tabs or any other spaces, comprising:
    means for generating an object including characters, marks, blank characters and other symbols from the document;
    means for generating a connection candidate between the objects; and
    means for evaluating validity of connection of the connection candidate using a language model;
   wherein the means for generating an object comprises:
      means for acquiring a symbol at every spatial coordinate, and associating the symbol with the coordinate in the document;
      means for determining a type of the symbol in a line of the document and generating a token composed of one or consecutive letters, symbols or other characters or a space composed of one or consecutive blank characters;
      means for determining an adjacency relation of the space in the vertical direction and generating a stream composed of spaces that extend over a plurality of lines; and
      means for determining a positional relation between the token and the stream and generating an initial text block that includes the token and blank characters.

11. The document processing system according to claim 10, further comprising:
    means for combining the objects corresponding to a source and destination of the connection candidate if it is determined that the connection of the connection candidate is valid.

12. The document processing system according to claim 10, further comprising means for associating a generated object with a coordinate indicating a spatial position of the document.

13. The document processing system according to claim 12, further comprising:
    means for generating the text block by combining the objects, wherein the text block is defined as a rectangular region with a minimum area that includes the objects, wherein the position of the text block is specified by the coordinates of opposing corners of the rectangular region in the document.

14. The document processing system according to claim 10, wherein the connection candidate between the objects is a connection with an object that adjoins the source object on the right side or a connection with an object that is located in the next line and on the left side of the source object.

15. The document processing system according to claim 10, wherein the language model is an N-gram model.

16. The document processing system according to claim 10, wherein the means for generating a token or space comprises:
    means for recording the symbols as a token composed of consecutive characters, if it is determined that the type of the symbol is not a blank character and the type of an adjoining symbol in the line is the same, or for recording the symbol as one or consecutive spaces if it is determined that the type of the symbol is a blank character; and
   wherein the means for generating a stream comprises:
   means for recording the spaces as a stream if it is determined that the spaces are adjoining over different lines in the vertical direction; and
   wherein the means for generating an object comprises:
   means for combining the two tokens and the space between them as an initial text block if a space interposed between two tokens in a line is not a stream.

17. The document processing system according to claim 10, further comprising:

means for generating all the initial text blocks and their connection candidates;

means for extracting initial text blocks of a single element and connection candidates from all the initial text blocks and connection candidates;

means for determining validity of connection of the initial text blocks of a single element and connection candidates using a language model; and means for combining the initial text blocks of a single element if it is determined that the validity of connection is valid.

18. The document processing system according to claim 10, further comprising:

if there is only a single connection candidate between the objects, the initial text blocks, or the text blocks combined thereof, means for combining them without determining validity of connection using a language model.

19. A computer-readable recording medium having recorded thereon a program for causing a computer to extract a text block from a document, wherein characters are laid out using blank characters, tabs or any other spaces, the program comprising computer code for causing the computer to perform the steps of:

generating an object composed of characters, marks, blank characters and other symbols from the document;

generating a connection candidate between the objects; and evaluating validity of connection of the connection candidate using a language model;

wherein the step of generating an object comprises:

acquiring a symbol at every spatial coordinate, and associating it with the coordinate in the document;

determining a type of the symbol in a line of the document and generating a token composed of one or consecutive letters, symbols or other characters or a space composed of one or consecutive blank characters;

determining an adjacency relation of the space in the vertical direction and generating a stream composed of spaces that extend over a plurality of lines; and determining a positional relation between the token and the stream and generating an initial text block that includes the token and blank characters.

20. The computer-readable recording medium of claim 19, wherein the computer code further comprises code for combining the objects corresponding to a source and destination of the connection candidate, if it is determined that the connection of the connection candidate is valid.

* * * * *